A. T. PEIRCE.
FILTER.
APPLICATION FILED JULY 21, 1908.
910,719.
Patented Jan. 26, 1909.
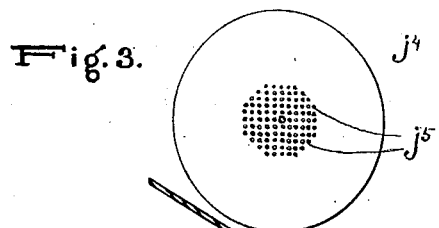
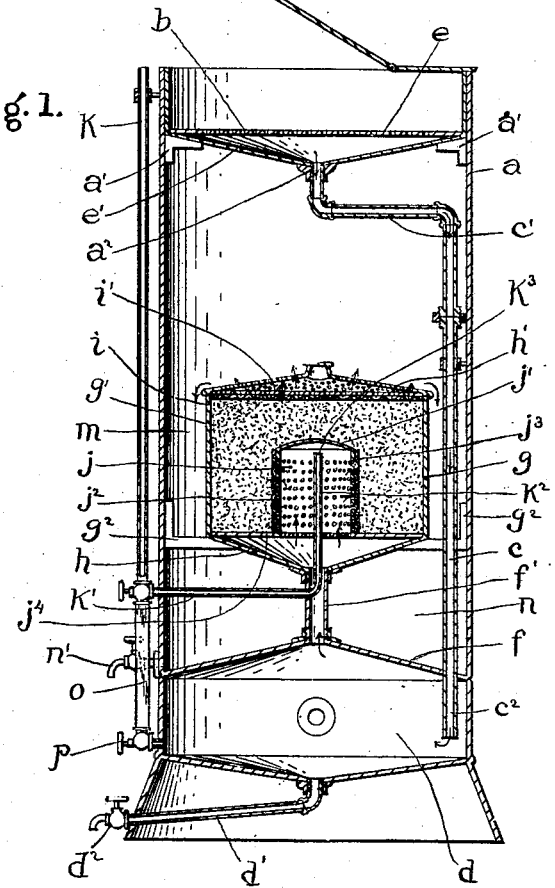
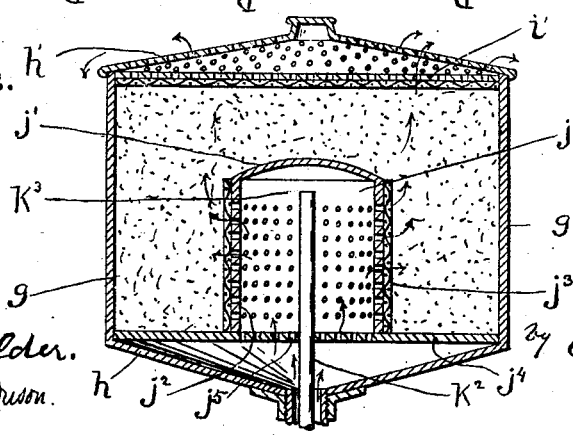

UNITED STATES PATENT OFFICE.

ADAMS TRUE PEIRCE, OF DOVER, NEW HAMPSHIRE.

FILTER.

No. 910,719.　　　Specification of Letters Patent.　　　Patented Jan. 26, 1909.

Application filed July 21, 1908. Serial No. 444,688.

*To all whom it may concern:*

Be it known that I, ADAMS TRUE PEIRCE, a citizen of the United States, resident of Dover, in the county of Strafford and State of New Hampshire, have made a certain new and useful Invention in Filters; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to oil filters, having for its object certain improvements upon the device of the Patent No. 459,099 granted to C. Porter September 8, 1891.

The invention consists in the novel construction and combinations of parts as hereinafter set forth.

In the accompanying drawings, illustrating the invention, Figure 1 is a central longitudinal section of the invention, Fig. 2 is a similar view of the lower filtering chamber on a larger scale and Fig. 3 is a detail plan view of the lower perforated partition in the lower filtering chamber.

In these drawings the letter $a$, designates the main chamber or incasement in which the parts of the filter are located. In this casing at the top or upper portion thereof is provided an upper filtering chamber $b$, having bracket supports $a'$, from the inside of the casing $a$, and detachable central screw-threaded engagement at $a^2$, with the pipe $c$, leading first to one side at $c'$, and thence downward at $c^2$, to near the bottom of the casing, where it communicates with the settling chamber $d$, having draw off pipe $d'$, and cock $d^2$. The chamber $b$, into which the oil to be filtered is poured, is provided with a horizontal perforated partition or strainer plate $e$, lying above the conical bottom $e'$, of the chamber, and serving to separate the larger particles and impurities from the oil.

$f$, designates a solid top plate or partition for the settling chamber $d$, and through which the pipe $c^2$, extends, said top plate having an upward extending central pipe $f'$, which communicates at its upper end with the lower or main filtering chamber $g$, which consists of a body $g'$, having support upon brackets $g^2$, extending from the sides of the chamber $a$, and having a cone-shaped solid bottom $h$, and a cone-shaped perforated top $h'$. This lower filtering chamber $g$, is filled preferably with sawdust, over the top of which is placed a horizontal layer of cloth $i$, and a horizontal perforated plate $i'$, the cone-shaped perforated top $h'$, fitting thereover.

At the bottom of the lower filtering chamber $g$, is located an inverted cup or inlet chamber $j$, resting upon a horizontal centrally perforated partition $j^4$, and having a closed top $j'$, and perforated sides $j^2$, a layer of cloth $j^3$, being placed around the perforated sides of the inlet chamber.

Leading from the bottom of the settling chamber to the top of the casing at the outside thereof is an air vent pipe $k$, having intermediately thereof a radial branch pipe $k'$, which extends centrally within the casing $a$, and within the upper portion of upward extending pipe $f'$, this branch pipe $k'$, having an upturned end portion $k^2$, extending vertically upward within the inverted laterally perforated inlet chamber $j$, at the central portion thereof, and having its open upper end $k^3$, located above the highest or uppermost row of lateral perforations of such inlet chamber.

In the use of the device the oil passes first downward from the chamber $b$, into the settling chamber at the bottom of the casing, any water contained in the oil collecting at the bottom of the settling chamber, whence it may be drawn off at $d^2$. The oil within the settling chamber passes upward within the pipe $f'$, and through the perforations $j^5$, of the partition $j^4$ to the inlet chamber $j$, the oil passing through the lateral perforations of such chamber and through the fine meshes of the cloth covering for the same to the sawdust within the filtering chamber $g$, wherein it rises, passing through the fine meshes of the cloth covering $i$, and through the perforations of the horizontal top plate $i'$, and cone-shaped top $h'$, fitting thereover. The filtered oil will thus fall over the sides of the filtering chamber $g$, downward within the annular space $m$, between the lower filtering chamber and the sides of the casing $a$, into the storage chamber $n$, for the filtered oil, such storage chamber having for its bottom the top plate of the settling chamber and being provided with a draw off cock $n'$.

$o$, is a gage glass inserted in the air vent pipe $k$, at the bottom portion thereof, and serving to indicate the state of the contents of the settling chamber.

As the oil passes into the settling chamber from the pipe $c^2$, the air in the chamber is forced out through the air vent pipe. As the oil passes upward within the pipe $f'$, more or less air is always carried therewith, such air being carried into the inlet chamber $j$, with the oil and collecting at the top of the chamber $j$, whence it will all be at once removed through the branch pipe connection $k'$, of the air vent pipe, inasmuch as the uppermost row of lateral perforations of the inlet chamber is below the open top of the pipe $k'$. In order that the air collecting thus in the chamber $j$, will readily pass off it is necessary when starting the filtering operation to close the lower gage cock $p$, such cock being opened when the current of outward moving air from the inlet chamber is well established. In this way all air is expelled as fast as the oil runs in, and the filtering begins immediately, saving several hours, as well as the objectionable overflow of oil from the air vent pipe which occurs with the Porter filter.

Having thus described the invention, what I claim as new and desire to secure by Letters Patent is:

1. In an oil filter, a casing having a bottom settling chamber provided with a solid top having an upward extending pipe, a filtering chamber having connection at its bottom with said upward extending pipe, and a central inlet chamber provided with lateral perforations and a solid top, an air vent pipe having connection at its bottom with the bottom of the settling chamber, a valve at its lower end, and a radial branch pipe extending upward within said inlet chamber.

2. In an oil filter, a casing having a bottom settling chamber, an upper filtering chamber having a perforated strainer plate and a pipe leading therefrom to near the bottom of the settling chamber, said settling chamber being provided with a solid top having an upward extending pipe, a lower filtering chamber having connection at its bottom with said upward extending pipe, and a central inlet chamber provided with lateral perforations and a solid top, an air vent pipe having connection at its bottom with the bottom of the settling chamber, a valve at its lower end, and a radial branch pipe extending upward within said inlet chamber.

3. In an oil filter, a casing having a bottom settling chamber, an upper filtering chamber having a perforated strainer plate and a pipe leading therefrom to near the bottom of the settling chamber, said settling chamber being provided with a solid top having an upward extending pipe, a lower filtering chamber having connection at its bottom with said upward extending pipe, and a central inlet chamber having a solid top and lateral perforations, and a strainer top plate, said casing having an annular interval between the same and the lower filtering chamber, an air vent pipe having connection at its bottom with the bottom of the settling chamber, a valve seat at its lower end, and a radial branch pipe extending upward within said inlet chamber.

In testimony whereof I affix my signature, in presence of two witnesses.

ADAMS TRUE PEIRCE.

Witnesses:
   JOHN Q. PIKE,
   WILLIAM A. GUN.